UNITED STATES PATENT OFFICE.

RAMON CASTELLS, OF BARCELONA, SPAIN.

PLASTIC COMPOSITION.

1,219,536.  Specification of Letters Patent.  Patented Mar. 20, 1917.

No Drawing.  Application filed June 24, 1915.  Serial No. 36,154.

*To all whom it may concern:*

Be it known that I, RAMON CASTELLS, of Provenza 240, 3°, 1ª, Barcelona, Spain, merchant, have invented a new and Improved Plastic Composition, which improvement is fully set forth in the following specification.

This invention has for its object a new material which is flexible, adherent and not easily breakable.

It is made from:

| | |
|---|---|
| Resin | 350 grams |
| Pure caoutchouc | 300 " |
| A solvent for resin and caoutchouc, as petroleum spirit, naphtha, for example | 100 " |
| Sulfur | 100 " |
| White lead | 200 " |

To color it 40 grams of vermilion for example may be added.

The resin is dissolved in a copper vessel, the other substances being added and well mixed over a hot fire.

When melted, the liquid is poured into a mold of the shape of the cake or bar desired, after which the mold is removed and the cake allowed to cool on marble for twenty four hours.

The proportions may vary within limits and some or all of the substances above enumerated may be replaced by equivalents.

This material when employed as sealing wax possesses in comparison therewith considerable advantages due to its plasticity, for on cooling after burning it preserves a remarkable suppleness which allows a seal formed of it to bend without breaking or cracking.

It may be rendered harder or softer as desired and more or less flexible. It is consequently a material applicable to several uses.

It may replace ebonite and india-rubber for most purposes and may be colored in a similar manner to ordinary sealing wax.

Claims:

1. A substitute for sealing wax comprising resin, caoutchouc, sulfur, white-lead, and a solvent for the resin and caoutchouc, substantially as described.

2. A product comprising resin, caoutchouc, sulfur, white-lead, and petroleum spirit, substantially as described.

3. A substitute for sealing wax comprising resin, caoutchouc, sulfur, white-lead, and a solvent for the resin and caoutchouc, said caoutchouc constituting less than two-fifths by weight of said substitute.

In testimony whereof I have signed this specification in the presence of two subscribing witnesses.

RAMON CASTELLS.

Witnesses:
 EUSEBIS BACLIA,
 MACARIO MARIP.

Copies of this patent may be obtained for five cents each, by addressing the "Commissioner of Patents, Washington, D. C."